United States Patent

Schmalz et al.

[11] Patent Number: 6,044,632
[45] Date of Patent: Apr. 4, 2000

[54] BACKUP PROXIMITY SENSOR FOR A VEHICLE

[75] Inventors: Steven C. Schmalz, Greenfield; Russell P. Schuchmann, Milwaukee; Joseph C. Zuercher, Brookfield, all of Wis.

[73] Assignee: Eaton Corporation, Cutler-Hammer Products, Milwaukee, Wis.

[21] Appl. No.: 09/018,873

[22] Filed: Feb. 5, 1998

[51] Int. Cl.[7] .............................. E21B 34/64; B60Q 1/00
[52] U.S. Cl. ........................ 56/10.2 R; 180/271; 340/435
[58] Field of Search ..................... 47/33, 1.7; 56/10.2 R, 56/10.2 A, 10.4, DIG. 15; 15/319, 339, 340.1; 180/169, 401, 271; 169/24, 54; 318/587; 340/431, 435

[56] References Cited

U.S. PATENT DOCUMENTS

| | | | |
|---|---|---|---|
| 4,887,415 | 12/1989 | Martin | 56/10.2 A |
| 5,397,890 | 3/1995 | Schueler et al. | 180/272 X |
| 5,455,557 | 10/1995 | Noll et al. | 280/427 |
| 5,574,426 | 11/1996 | Shisgal et al. | 180/275 X |

OTHER PUBLICATIONS

Viggh, Herbert E.M. and Fynn, Anita M., "Infrared People Sensors for Mobile Robots," SPIE vol. 1007 Mobile Robots III (1998), pp. 391–398.

*Primary Examiner*—Robert E. Pezzuto
*Attorney, Agent, or Firm*—Hoffmann & Baron, LLP

[57] ABSTRACT

A backup proximity sensor for a vehicle includes a first passive infrared sensor (PIR) and a second PIR vertically mounted with respect to one another on a pivotal support member. The first PIR and second PIR are angularly directed such that the respective fields of view converge, establishing a detection zone in a region behind a vehicle. A drive motor and scanning gear box are coupled to the pivotal support member and pivotally drive the first and second PIR in an oscillatory fashion about a predetermined arc. This establishes relative motion between the PIRs and a stationary warm body in the field of view of the two sensors, allowing the stationary body to be detected. A detection circuit receives output signals from the first PIR and second PIR and generates an output signal indicative of a warm body being detected by both the first and second PIRs. This eliminates false alarms generated by warm bodies outside the region of the desired detection zone.

19 Claims, 11 Drawing Sheets

BACKUP PROXIMITY SENSOR FOR A VEHICLE

BACKGROUND OF THE INVENTION

1. Field of the Invention

The present invention relates generally to proximity sensors and more particularly relates to proximity sensors adapted to sense warm bodies which are located behind a vehicle.

2. Description of the Prior Art

The problem of detecting warm bodies, such as people and animals, in an area behind a vehicle is well established. The problem is especially acute in the field of farm tractors and lawn mowing equipment. Presently, more than 5,000 injuries occur each year as a result of misuse of such equipment. A large percentage of these injuries are inflicted when a tractor is backing up and inadvertently strikes an unseen victim, resulting in impact injuries and lacerations from contact with a spinning mower blade.

Various forms of sensors have been employed in collision avoidance systems for vehicles. Among these systems are radio-based sensors (radar), ultrasonic sensors, laser-based radar and infrared sensors. Of these sensor technologies, passive infrared sensors (PIR) are particularly well suited for applications where it is desirable to discriminate warm bodies from inanimate objects. PIR sensors, which are well known in the art, employ pyro-electric or thermopile detectors to sense movement of a warm body in the sensors' field of view. Such sensors are commonly used in security systems to detect the presence of an intruder within a protected premise. PIR sensors have also been used in robotic systems to detect and track people in the vicinity of a mobile robotic system.

Vehicles, such as lawn tractors and the like, typically operate in an open outdoor environment which is subject to various sources of sensor interference. The typical environment may include irrigation sprinkler systems and fences made of conductive material which substantially interfere with the operation of radio-based proximity sensors. The environment may also include thermal "hot spots," such as areas where solar heating occurs on the ground, which interferes with the operation of conventional PIR sensors. Therefore, there remains a need for a backup proximity sensor system for a vehicle which overcomes the problems associated with devices known in the prior art.

OBJECTS AND SUMMARY OF THE INVENTION

It is an object of the present invention to provide a backup proximity sensor for a vehicle.

It is another object of the present invention to provide a backup proximity sensor for a vehicle which can discriminate between warm bodies and inanimate objects located behind a vehicle.

It is yet another object of the present invention to provide a backup proximity system for a vehicle which alters the vehicles operation when a warm body is detected behind the vehicle.

It is a further object of the present invention to provide a backup proximity sensor which pivotally scans a region behind a vehicle to detect the presence of a warm body in a broad field of view.

It is still a further object of the present invention to provide a backup proximity sensor which employs passive infrared sensors to detect warm bodies behind a vehicle.

It is yet a further object of the present invention to provide a backup proximity sensor employing passive infrared sensors which is substantially immune from false sensing of thermal hot spots on the ground.

It is yet another object of the present invention to provide a backup proximity sensor for a vehicle which can detect a stationary warm body behind the vehicle.

In accordance with one form of the present invention, a backup proximity sensor is formed having a first passive infrared (PIR) sensor and a second PIR sensor. The first and second PIR sensors are mounted vertically with respect to one another on a common, pivotal member. The first and second PIR sensors each have an associated field of view and generate an output signal when a warm body is moving within the field of view. A detection circuit receives signals from the first and second PIR sensors and provides an output signal when both the first and second PIR sensors indicate the presence of a warm body. The first and second sensors are angularly directed to one another such that the field of view of the first and second PIR sensors intersect, thereby forming a detection zone. A motor and drive assembly are coupled to the pivotal member and drive the member and PIR sensors in an oscillatory manner, such that the detection zone scans an arc behind a vehicle.

In a preferred form of the present invention, the first PIR sensor is mounted below the second PIR sensor. The first PIR sensor is angularly directed such that its field of view is substantially parallel to the surface the vehicle is moving on. The second PIR sensor is angularly directed downward, to effect the intersection of the fields of view. This establishes a detection zone behind the vehicle at a predetermined height above ground level such that hot spots on the ground are not detected.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
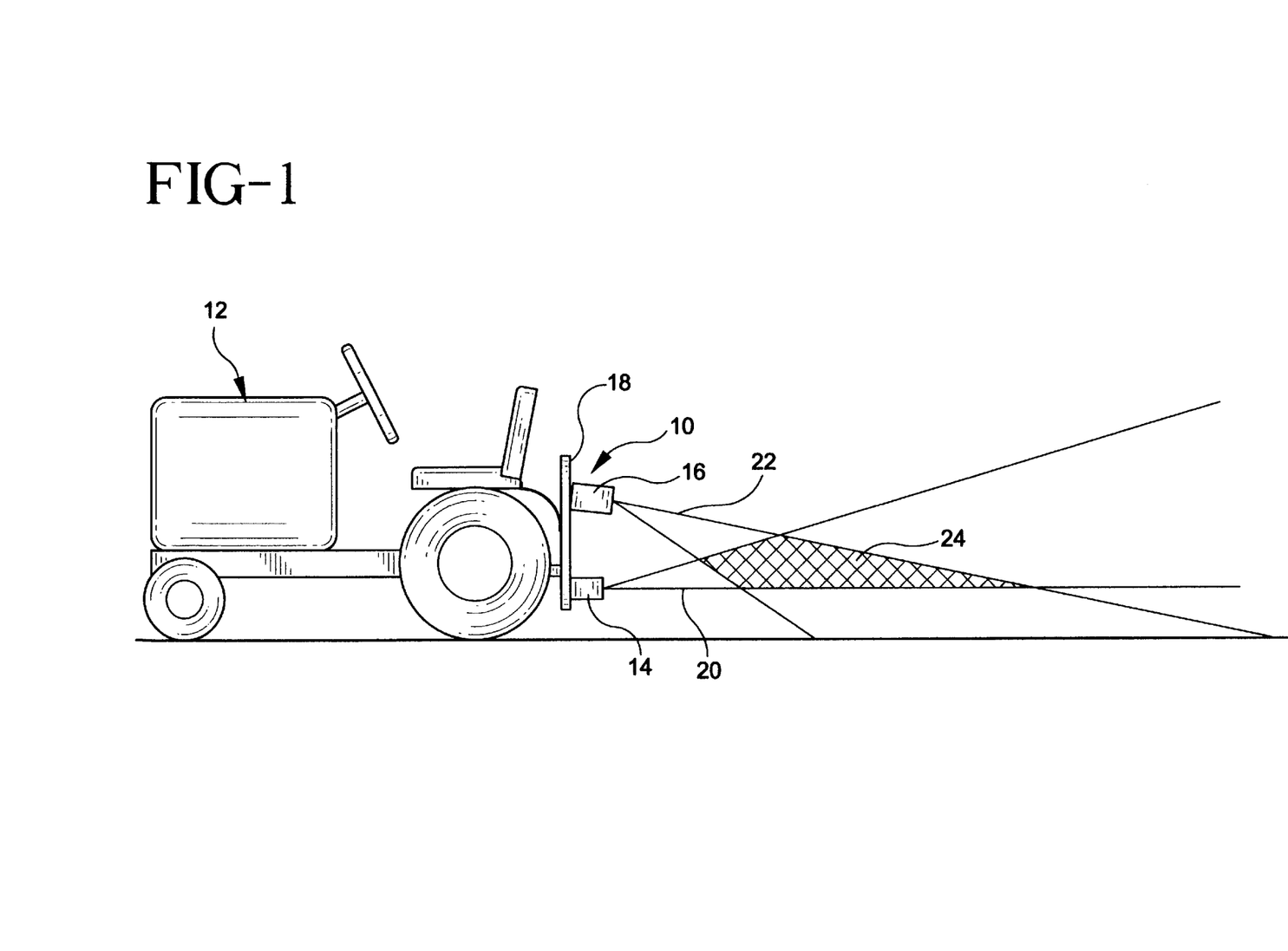
FIG. 1 is a pictorial view of a backup proximity sensor formed in accordance with the present invention mounted on a vehicle, such as a tractor, the pictorial depiction illustrating the use of two passive infrared sensors to create a detection zone behind the vehicle.
Figure 1A:
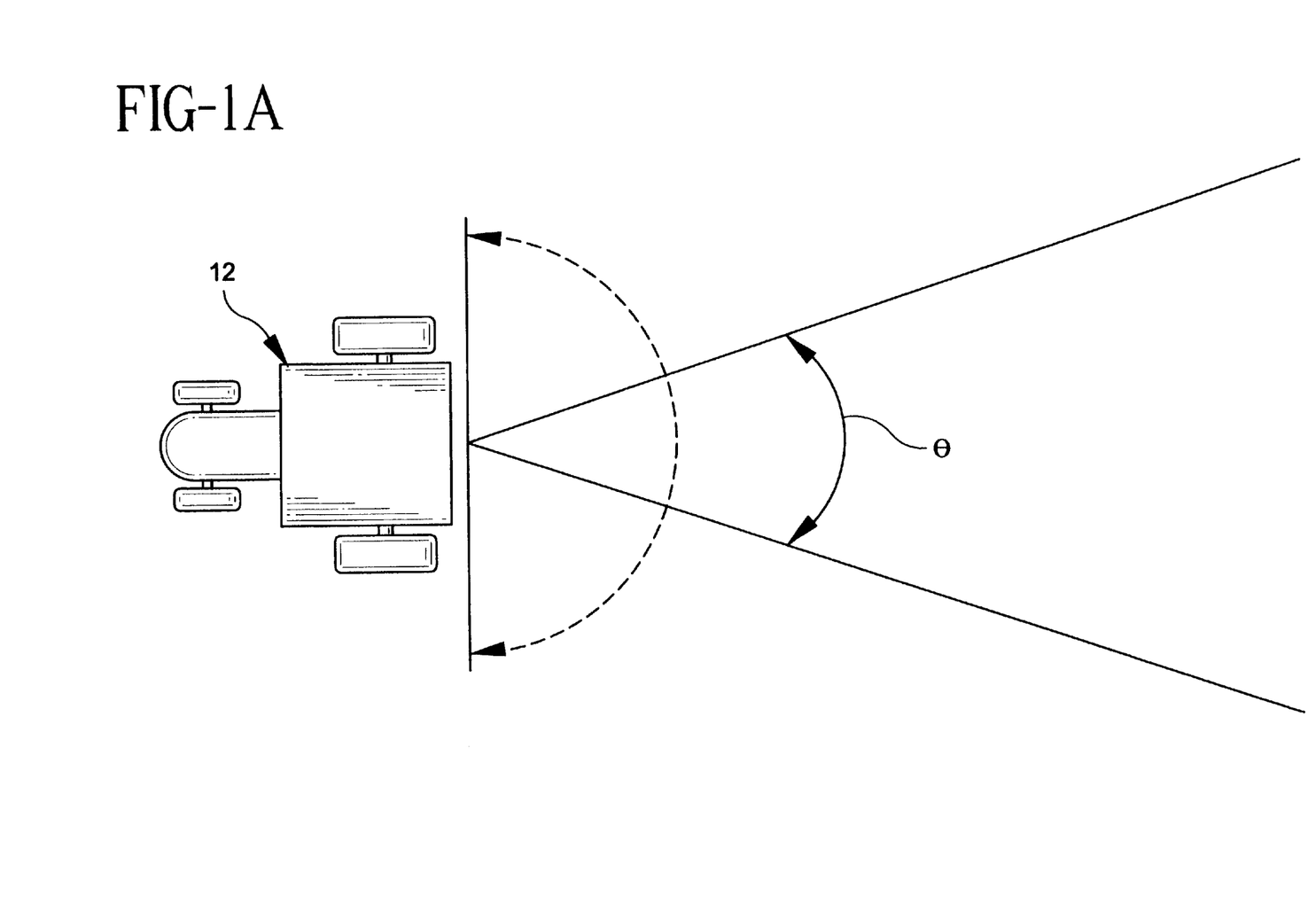
FIG. 1A is a top view illustrating the field of view of a typical passive infrared sensor formed in accordance with the present invention.
Figure 2:
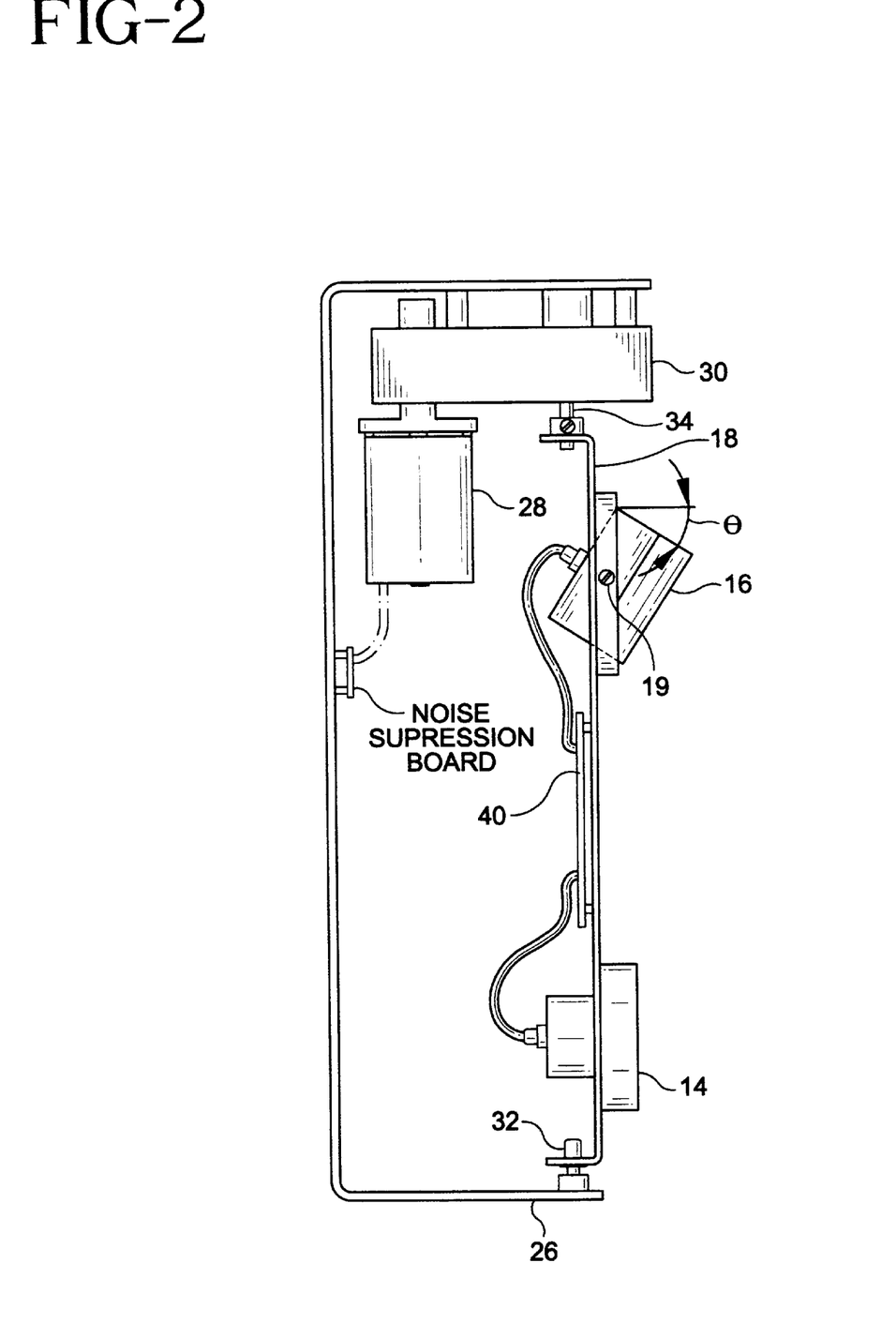
FIG. 2 is a side elevation view of a backup proximity sensor formed in accordance with the present invention.
Figure 3:
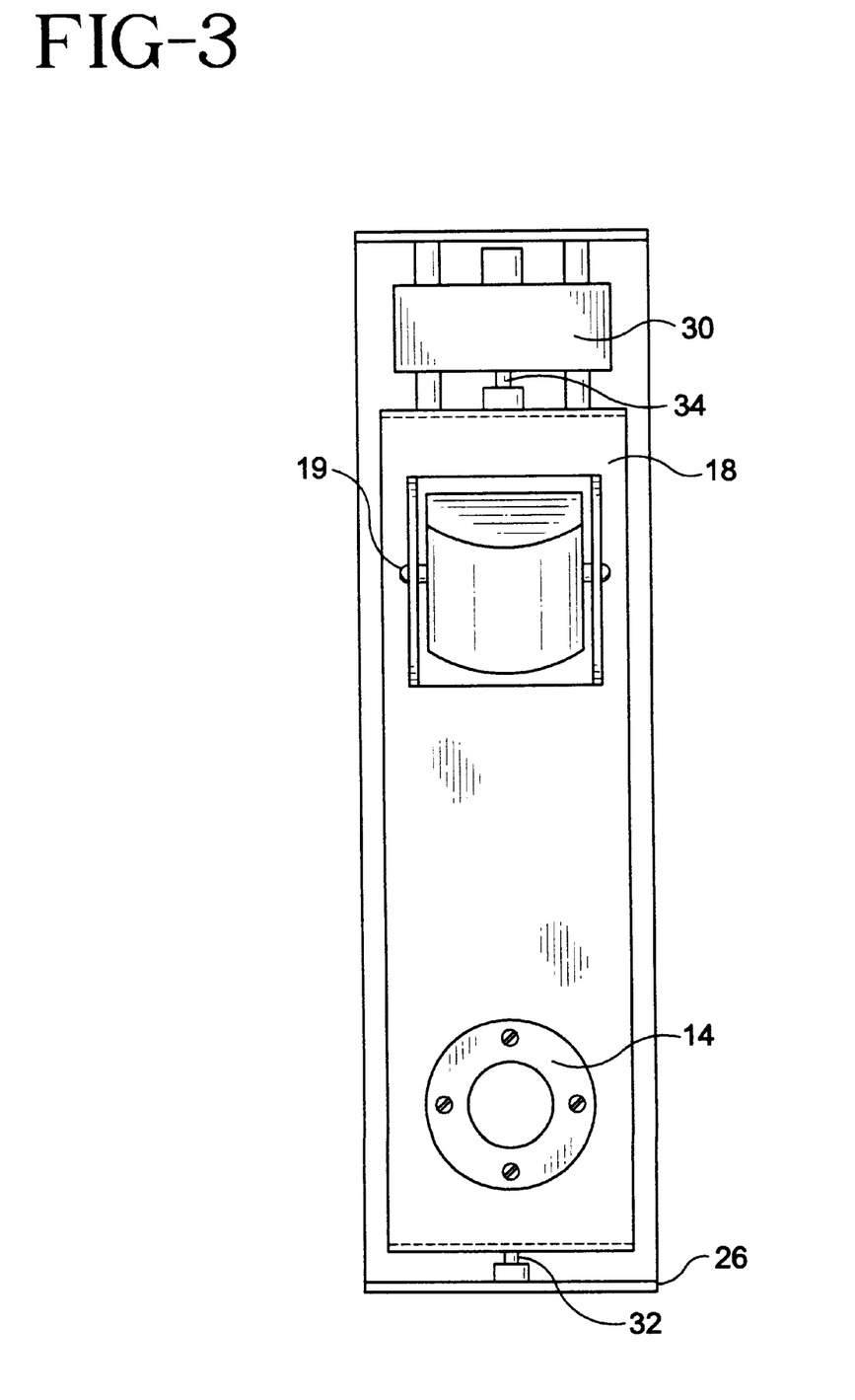
FIG. 3 is a front elevation view of the backup proximity sensor depicted in FIG. 2.

FIGS. 1–3 generally illustrate a backup proximity sensor formed in accordance with the present invention. Referring to FIG. 1, a backup proximity sensor (BUPS) 10 is illustrated affixed to a rear portion of a vehicle 12. The BUPS 10 includes a first passive infrared sensor (PIR) 14 and a second PIR 16. The first PIR 14 and second PIR 16 are vertically mounted with respect to one another on a support member 18. The first PIR 14 has an associated first field of view 20 and generates an output signal when a warm body is moving within the first field of view 20. The second PIR 16 has an associated second field of view 22 and generates an output signal when a warm body is moving within the second field of view 22. Suitable PIR sensors are manufactured by Eltec, such as model number 442, which with an appropriate lense provides a uniform 6° field of view ($\theta$, FIG. 1A).

The first PIR 14 and second PIR 16 are angularly directed in a converging manner such that the first field of view 20 intersects the second field of view 22. The area of intersection of the first field of view 20 and the second field of view 22 defines a detection zone 24. The position and size of the detection zone 24 are determined by the vertical spacing between the first PIR 14 and the second PIR 16, as well as the angular direction of the first PIR 14 with respect to the second PIR 16.

An important consideration in vehicles such as tractors and lawn mowers is avoiding false detection of "hot spots" located on the ground which result from uneven solar warming. Such hot spots are created by sunlight filtering through partially shaded areas as well as areas of different coloration which absorb different amounts of solar heat. To avoid false indications of a warm body which result from the detection of hot spots, it is preferred that the first PIR 14 is directed horizontally, such that the first field of view 20 is directed substantially in parallel with, and above, the ground. Depending on expected terrain variation and target size, the first PIR 14 can be mounted approximately four inches to twelve inches above the ground. The second PIR 16, which is mounted between six inches and eighteen inches above the first PIR 14, is then angled toward the first PIR 14 enabling the second field of view 22 to intersect with the first field of view 20. This creates a detection zone 24 which does not contact ground level and is therefore "blind" to hot spots on the surface of the ground, as illustrated in FIG. 1. The second PIR 16 is preferably mounted on an adjustable pivot bracket 19 to facilitate easy angular adjustment of the second PIR 16 to alter the size and location of the detection zone 24.

In an exemplary embodiment, the first PIR 14 is mounted approximately eight (8) inches above the ground and the second PIR 16 is mounted above the first PIR 14 by a distance of approximately twelve (12) inches. The second PIR 16 is directed at an angle ($\phi$) of approximately 16° below the horizon. This establishes a detection zone 24 located 8 inches above ground level which begins approximately one foot behind the vehicle and extends a distance of approximately ten feet behind the vehicle.

Passive infrared (PIR) sensors, of the pyro-electric type, are only sensitive to the movement of warm bodies. Therefore, a stationary PIR sensor cannot detect the presence of a stationary warm body. In order to detect the presence of a stationary warm body, a preferred embodiment the present invention employs mechanical rotational scanning of the first PIR 14 and second PIR 16. Referring to FIG. 2, the support member 18 is pivotally affixed to a mounting frame 26 and a pivotal drive mechanism, including a drive motor 28 and scanning gear box 30. A lower section of support member 18, which is proximate the first PIR 14, includes a pivot bearing 32 which creates the pivotal interface between the support member 18 and the mounting frame 26. An upper portion of the support member 18, proximate the second PIR 16, is affixed to a shaft 34 of the scanning gear box 30.

The drive motor 28 and scanning gear box 30 are selected to generate an oscillatory rotational pivoting motion of the shaft 34. Preferably, the oscillatory motion has a repetition rate of approximately 1 Hertz. This can be generated using a suitable 12 volt DC motor driving a scanning gear box 30 which includes a Pitman arm mechanism. The Pitman arm translates the full rotational motion of the drive motor 28 into the desired oscillatory, partial rotation back and forth of shaft 34. The rotational range of the shaft 34 is preferably selected to sweep the detection zone 24 over a large arc behind the vehicle 12, as illustrated in FIG. 1A.

By pivotally rotating the first PIR 14 and second PIR 16 about a common vertical axis, defined by the support member 18, relative motion is established between the PIR sensors 14, 16 and a stationary warm body target located behind the vehicle 12. The pivotal rotation also provides broad coverage using fairly narrow field of view PIR sensors 14, 16. The use of narrow field of view sensors (i.e., $\theta$ less than 10°) is preferred in that enhanced warm body discrimination is achieved.

The first PIR 14 and second PIR 16 are each responsive to warm body targets which are within their respective fields of view. For example, in response to detection of a moving warm body within the first field of view 20, the first PIR 14 generates a first output signal indicating the presence of the warm body. Similarly, if a warm body is moving within the second field of view 22, the second PIR 16 generates a second output signal. If the warm body is located within the detection zone 24, both the first PIR 14 and second PIR 16 will generate an output signal. The backup proximity sensor 10 of the present invention further includes a detection circuit 40 which receives the first and second output signals and generates a third output signal when a warm body is within the detection zone 24.

Figure 4:
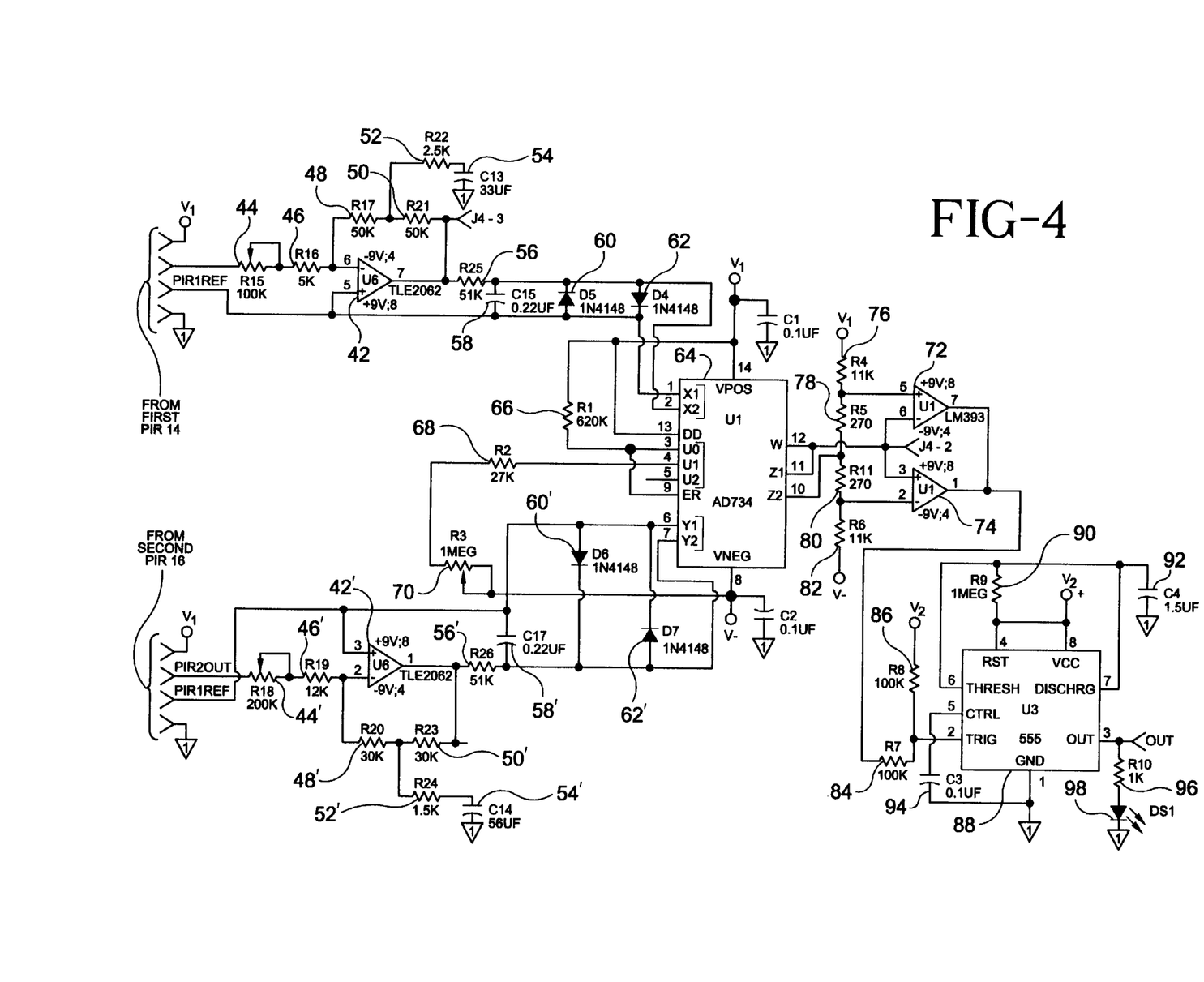
FIG. 4 is an electrical schematic diagram of a detection circuit for a backup proximity sensor formed in accordance with the present invention.

An exemplary detection circuit 40 is illustrated in the schematic diagram of FIG. 4. The output signals from each of the first PIR 14 and second PIR 16 are preferably amplified and filtered by the detection circuit 40. For example, the output signal from the first PIR 14 is preferably applied to an operational amplifier 42 through two series resistors 44 and 46. Preferably, resistor 44 takes the form of a potentiometer to adjust the signal gain of operational amplifier 42 over a range from about 1–20. The circuit also includes resistors 48 and 50 which are connected in series with each other and in feedback across the operational amplifier 42 to establish the gain of operational amplifier 42.

Preferably, a compensating high pass filter is formed by the inclusion of resistor 52 and capacitor 54 at the junction of resistor 48 and resistor 50. Resistor 52 and capacitor 54 are connected in series with each other forming a series R-C network which is connected to circuit ground. Resistor 52 and capacitor 54 cooperate with operational amplifier 42 to form a high pass filter with a cut off frequency of about 10 Hertz. The output of operational amplifier 42 is then coupled through a low pass filter section formed with series resistor 56 and shunt capacitor 58. Two back-to-back diodes, 60, 62 are coupled in parallel with capacitor 58 and clamp the output signal from operational amplifier 42 to ±0.7 volts. This signal is applied to a first input terminal of a correlation circuit 64.

The output signal from the second PIR sensor 16 is preferably amplified, filtered and clamped in a similar manner to that just described and is applied to a second input of the correlation circuit 64. Corresponding components have been designated with corresponding, but primed, reference designations.

The correlation circuit 64 is responsive to the signals received on the first and second input terminals and generates an output signal when the input signals indicate that a warm body is present in the field of view of both the first PIR 14 and second PIR 16. Preferably, the correlation circuit 64 takes the form of a multiplication correlation function integrated circuit, such as Analog Devices model AD734 four quadrant analog multiplier integrated circuit. In this embodiment, the correlation circuit 64 performs analog multiplication of the first PIR 14 output signal and second PIR 16 output signal. The output signal is then proportional to the product of the two signals. Three resistors 66, 68 and 70 are included to establish the multiplication gain of the correlation circuit 64. Only when both the first PIR 14 and second PIR 16 detect a warm body does the output signal reach a level indicative of a warm body within the detection zone 24. Clamping the signals from opamps 42, 42' to ±0.7 volts, as previously described, prevents a large recieved signal (i.e., from a very warm body) detected by only one of the PIR sensors from generating a false correlation output signal.

Preferably, the output of the correlation circuit 64 is applied to a comparator circuit including a first comparator circuit 72 and a second comparator circuit 74. Reference voltages for the first comparator circuit 72 and second comparator circuit 74 are generated by a resistor voltage divider network including four series connected resistors 76, 78, 80 and 82 which are connected between a positive and a negative voltage source. Preferably, the first comparator circuit 72 and second comparator circuit 74 are open collector devices with their respective outputs tied together to a common pull-up resistor network 84, 86.

The outputs of the first comparator circuit 72 and second comparator circuit 74 are normally set in a high impedance state which allows a voltage to be applied through resistor 86 to a one-shot pulse forming circuit 88. When the output signal from the correlation circuit 64 indicates that a warm body is within the detection zone 24, the output of either the first comparator circuit 72 or second comparator circuit 74 pulls the voltage down through resistor 86, activating the one-shot pulse forming circuit 88.

The one-shot pulse forming circuit 88 receives an input signal from the first comparator circuit 72 and second comparator circuit 74 and generates a pulse of a predetermined pulse width and amplitude. A suitable one-shot circuit 88 can be formed in a manner known in the art such as by using an NE555 integrated circuit in combination with timing resistor 90 and capacitor 92 as illustrated. Capacitor 94 is also included and provides signal decoupling to the one shot circuit 88. The output signal from the one-shot circuit 88, which is indicative of a target within the detection zone 24, is presented on an output terminal of one-shot circuit 88. Preferably, an optical display is operatively coupled to the output terminal to visually indicate the presence of a target behind the vehicle. Such a display is formed with a series resistor 96 in combination with a light emitting diode 98 connected between the output terminal and a circuit ground potential.

Table 1, shown on the following page, illustrates values of the previously identified components used in an illustrative embodiment of the present invention. With these exemplary component values, $V_1$ is selected to be +9 VDC, $V_2$ is selected to be +12 VDC and V– is selected to be –9 VDC.

TABLE 1

| Designation(s) | Type | Value |
| --- | --- | --- |
| 42, 42' | OP AMP | TLE 2062 |
| 44 | POT | 100K |
| 46 | Res. | 5K |
| 48, 50 | Res. | 50K |
| 52 | Res. | 2.5K |
| 54 | Cap | 33 µf |
| 56, 56' | Res. | 51K |
| 58, 58' | Cap | 0.22 µf |
| 60, 62, 60', 62' | Diode | 1N4148 |
| 44' | POT | 200K |
| 46' | Res. | 12K |
| 48', 50' | Res. | 30K |
| 52' | Res. | 1.5K |
| 54' | Cap | 56 µf |
| 64 | QUAD Mult. | AD734 |
| 66 | Res. | 620K |
| 68 | Res. | 27K |
| 70 | POT | 1M |
| 72, 74 | Comparator | LM 393 |
| 76, 82 | Res. | 11K |
| 78, 80 | Res. | 270 |
| 84, 86 | Res. | 100K |
| 88 | Timer | NE555 |
| 90 | Res. | 1M |
| 92 | Cap | 1.5 µf |
| 94 | Cap | 0.1 µf |
| 96 | Res. | 1K |
| 98 | LED | Red |

Figure 5:
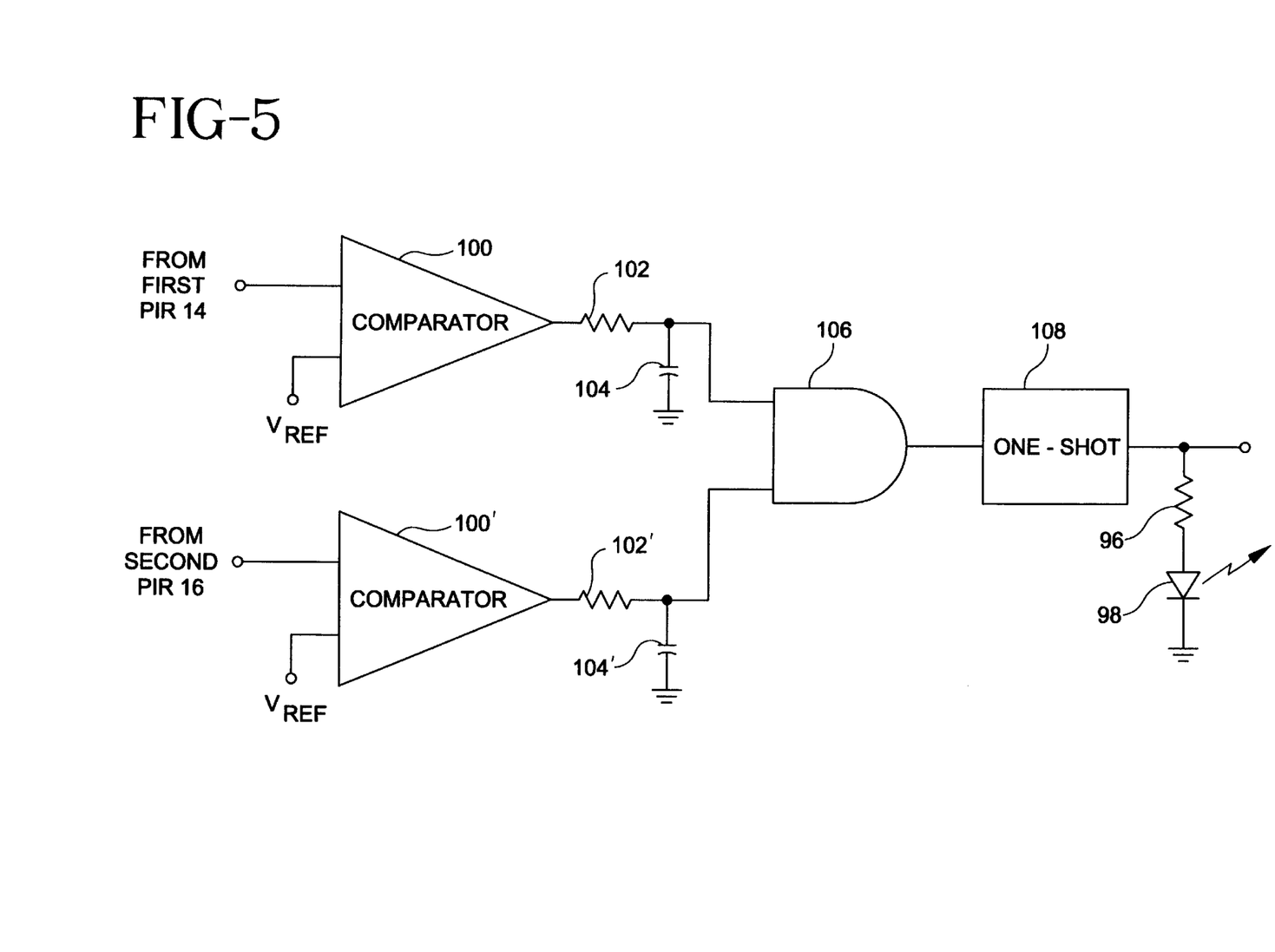
FIG. 5 is a schematic diagram of an alternate embodiment of a detection circuit, formed in accordance with the present invention.

FIG. 5 is a schematic diagram of an alternate embodiment of a detection circuit formed in accordance with the present invention. Referring to FIG. 5, the output signal from the first PIR 14 is applied to a first comparator circuit 100. The first comparator circuit 100 compares the output signal from the first PIR 14 to a reference voltage and generates a two-state output signal indicative of presence or absence of a warm body in the field of view 20 of the first PIR 14. Preferably, the output signal from comparator circuit 100 is a logic level voltage, such as zero and five volts. A series resistor 102 and shunt capacitor 104 form a low pass filter to remove noise spikes from the output of comparator 100. The output signal from the second PIR 16 is processed in a similar manner, as shown in FIG. 5, where primed numbers indicate equivalent components.

The filtered outputs of comparator circuits 100 and 100' are applied to an AND gate 106. The AND gate 106 generates an output signal only when a positive logic signal is received from the outputs of comparators 100 and 100', indicative of a warm body being present in the field of view of both the first PIR 14 and second PIR 16. The output of the AND gate 106 is preferably applied to a one-shot pulse circuit 108 which receives the output signal from the AND gate 106 and generates a pulse output of a predetermined width and amplitude. The output signal from the one-shot circuit 108 is applied to an output terminal. Preferably, a display circuit including a resistor 96 and light emitting diode 98, as previously described, is coupled to the output terminal of the one shot circuit 108.

Figure 6:
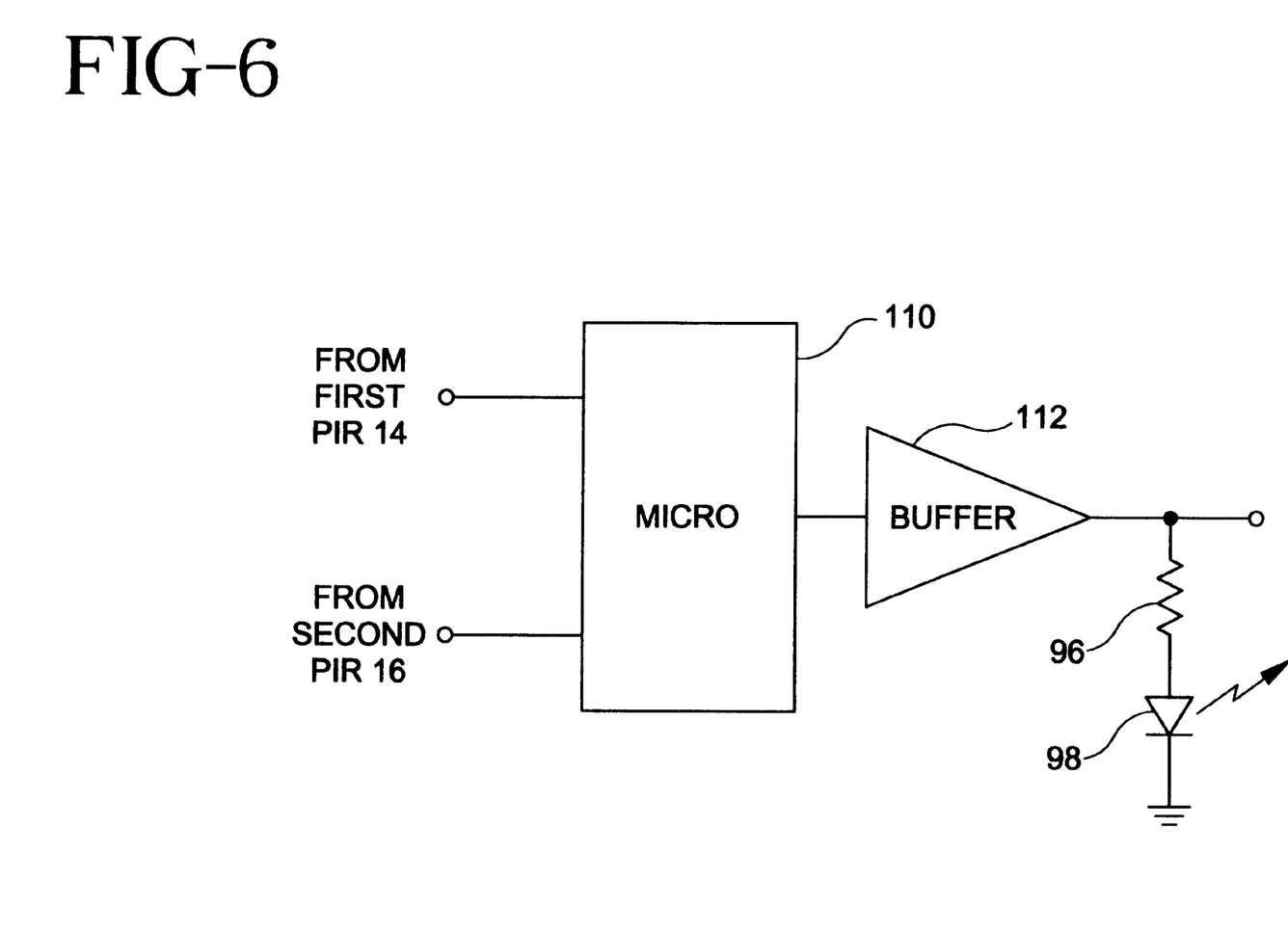
FIG. 6 is a schematic diagram of an alternate embodiment of a detection circuit, formed in accordance with the present invention.

FIG. 6 illustrates yet another embodiment of a detection circuit formed in accordance with the present invention. This circuit embodiment is particularly useful when the first PIR 14 and second PIR 16 generate output signals which are in the form of logic level signals. In this case, the signals from the first PIR 14 and second PIR 16 are applied to input terminals of a microprocessor 110. If the output signals from the first PIR 14 and second PIR 16 are not compatible logic level signals, comparator circuits as illustrated in FIG. 5 may be interposed between the PIR's and the microprocessor 110. Alternatively, analog to digital convertors may be interposed between the PIR's and the microprocessor 110.

The microprocessor 110, running a suitable program, compares the output signals from the first PIR 14 and second PIR 16 and generates an output signal when a warm body is detected in the field of view of both the first PIR 14 and second PIR 16. Preferably, the output signal from the microprocessor 110 is passed through a buffer amplifier 112 to protect the microprocessor 110. The output from the buffer amplifier 112 is applied to an output terminal and also preferably to a display circuit including a resistor 96 and light emitting diode 98, as previously described.

Figure 7:
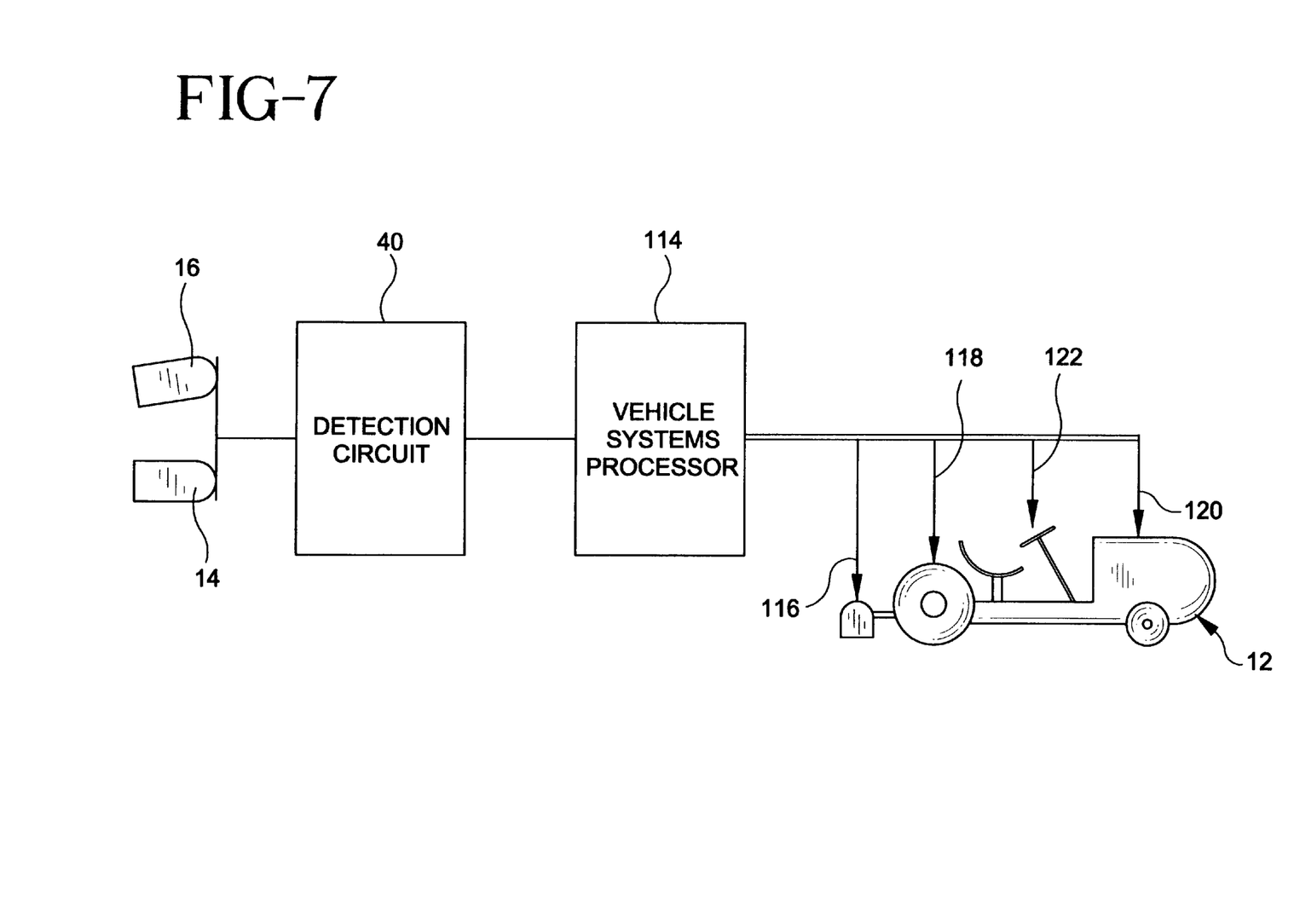
FIG. 7 is a block diagram illustrating the electrical interface between a backup proximity sensor, formed in accordance with the present invention, and a vehicle, such as a lawn tractor.

FIG. 7 is a block diagram illustrating a vehicle 12 interfaced to a back up proximity sensor 10 formed in accordance with the present invention. The detection circuit 40, regardless of the specific embodiment selected, generates an output signal which is indicative of the presence of a warm body within the detection zone 24. This output signal can directly drive a visual warning system, as previously described. In addition, the output signal from detection circuit 40 can be provided to a vehicle systems processor 114 which interfaces to selected vehicle operations.

For example, the vehicle systems processor 114 can provide a signal to a lawn mower blade disable system 116 on a tractor, stopping the motion of the cutting blade when a warm body is detected. Similarly, the vehicle systems processor 114 can control an automated braking system 118 and/or an engine disable circuit 120 to prevent further motion of the vehicle 12 toward a detected warm body. In addition, an enhanced driver warning system 122 employing audio, visual and/or tactile indications, such as a vibration in the drivers seat or steering mechanism, can also be activated by the vehicle systems processor 114. In this manner, a BUPS 10 of the present invention can alter the operation of a vehicle to avoid impacting a warm body behind the vehicle.

The magnitude of the output signals from the first PIR 14 and second PIR 16 are proportional to the distance of the warm body, the temperature of the warm body and the speed of the relative motion between the warm body and the PIR sensors. Therefore, it is preferable for the pivotal drive mechanism to maintain a uniform sweep speed throughout the full range of motion. When this is not the case, such as when a Pitman arm mechanism is employed, the sensor gain effectively varies with changing pivot speed.

Figure 8:
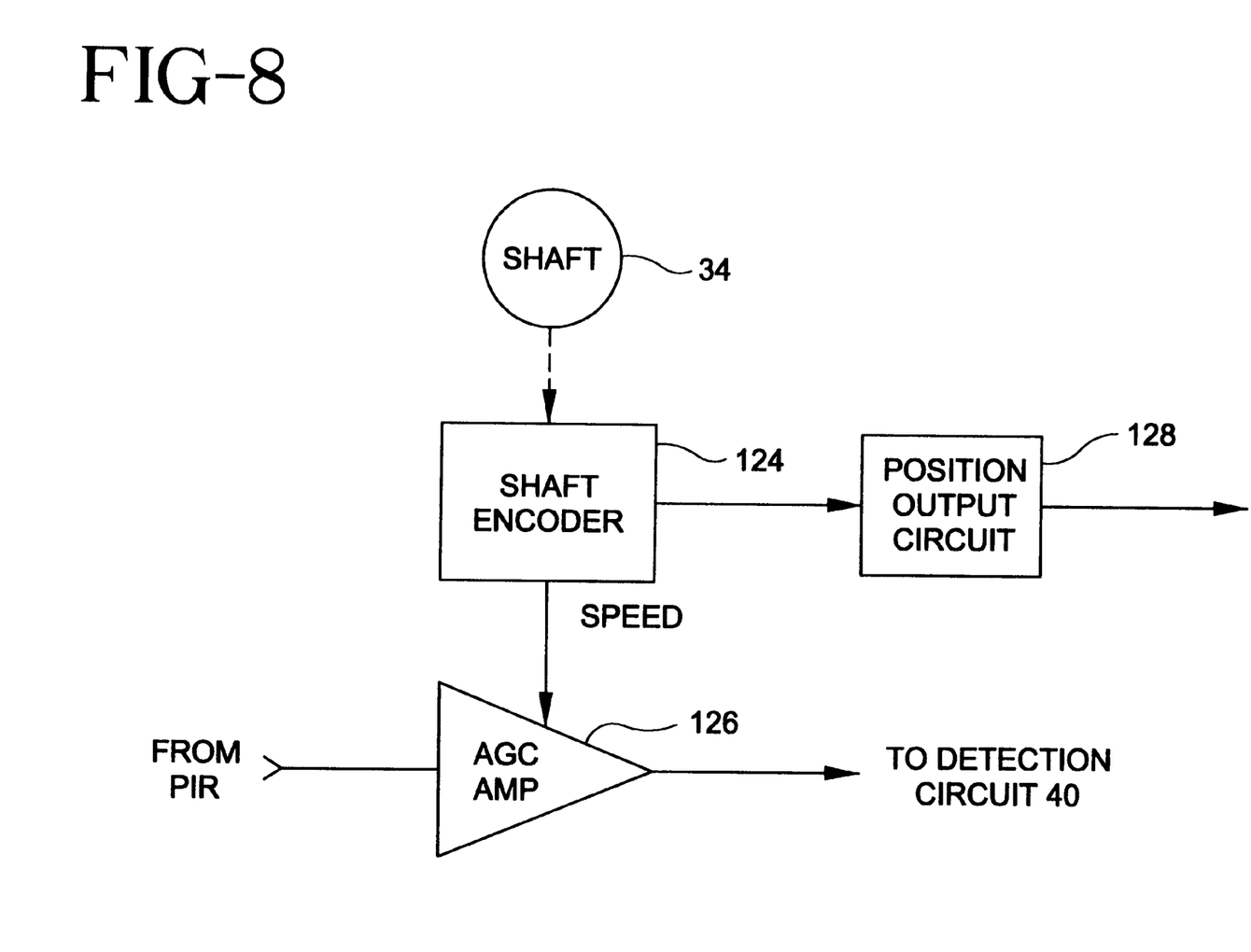
FIG. 8 is a block diagram of a circuit for the detection of scanning speed and position, formed in accordance with the present invention.

Referring to FIG. 8, in order to compensate the PIR sensor output signals for changing speed, a position sensor, such as a shaft encoder 124, is operatively coupled to shaft 34. The shaft encoder 124 generates an output signal which is proportional to the rotational speed of shaft 34. This output signal is applied to a control input terminal of an automatic gain controlled (AGC) amplifier 126 to provide substantially uniform signal output over the full range of sensor motion.

The signal from the shaft encoder 124 can also be applied to a position output circuit 128 to determine the approximate angular position of a detected warm body.

Figure 9:
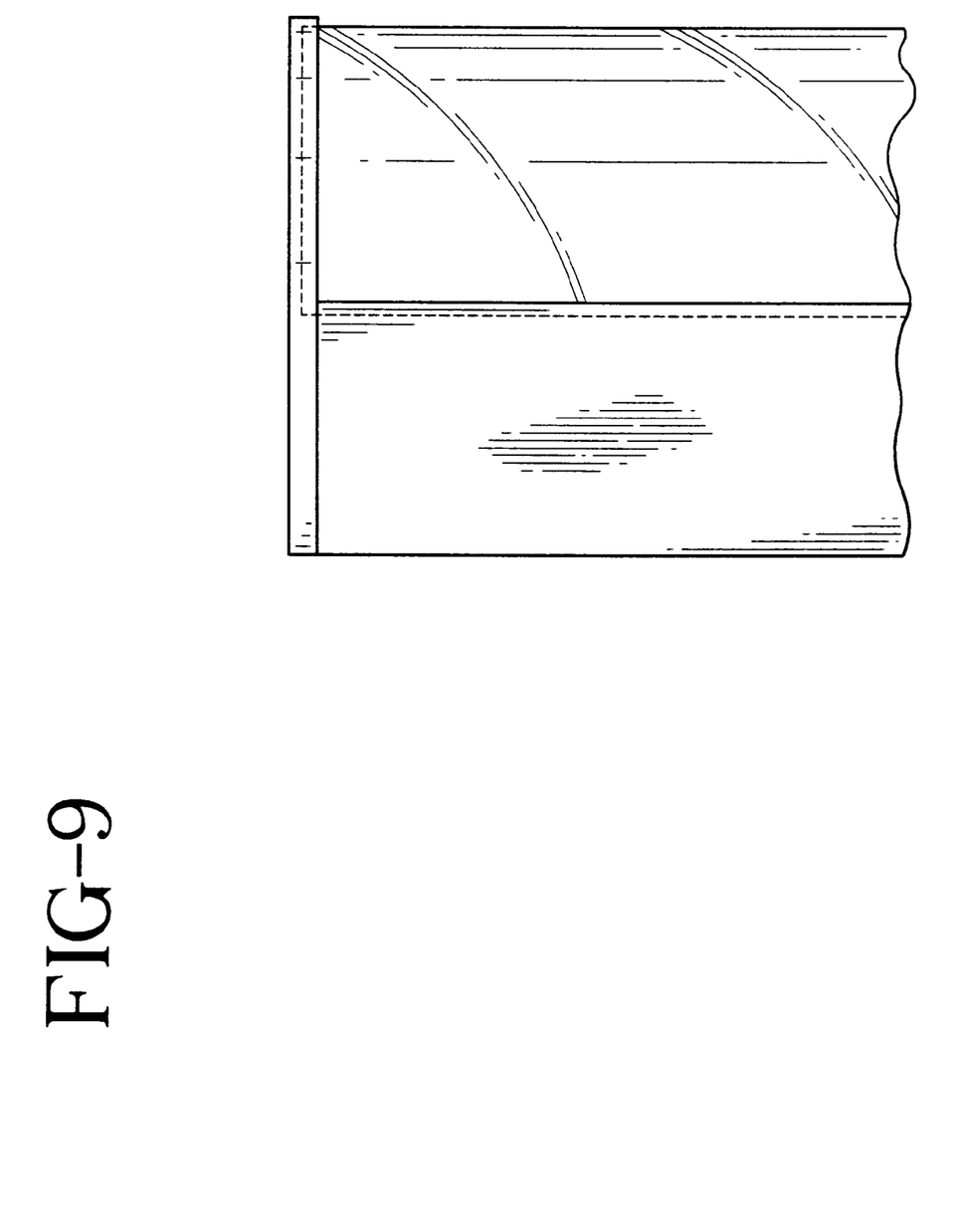
FIG. 9 is a partial side elevation view of a backup proximity sensor housing formed in accordance with the present invention.
Figure 10:
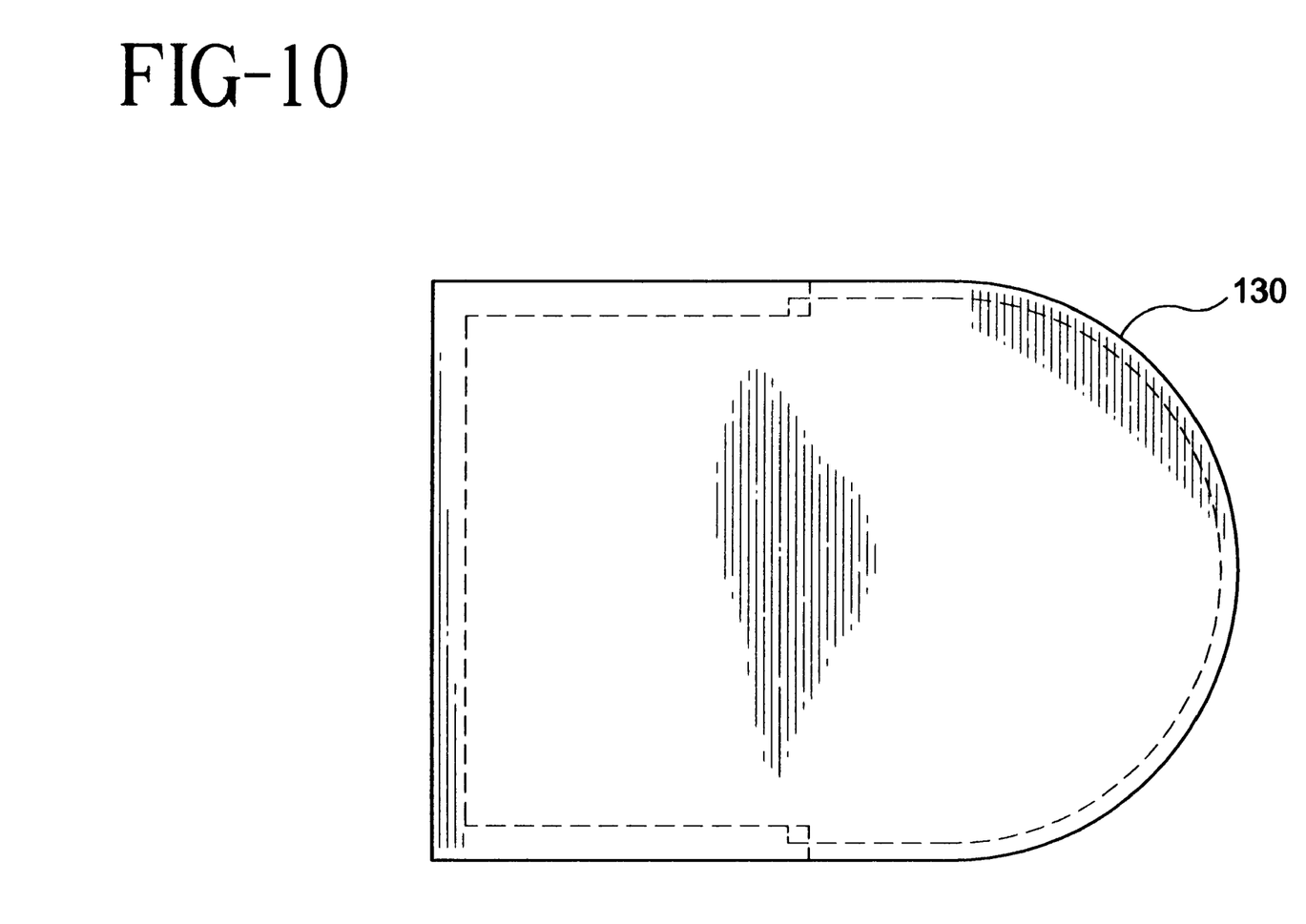
FIG. 10 is a top plan view of a backup proximity sensor housing formed in accordance with the present invention.

FIGS. 9 and 10 illustrate a housing suitable for enclosing the backup proximity sensor of the present invention. Preferably, the sides, back, top and bottom of the enclosure are formed from a substantially weatherproof material, such as plastic, to enclose and protect the electromechanical assembly. The enclosure further includes a front portion which is formed as a substantially cylindrical face plate. Preferably, the face plate 130 is formed from a material such as Poly IR®, which substantially transmits infrared energy without distortion or signal loss.

A backup proximity sensor formed in accordance with the present invention provides enhanced protection behind a vehicle. The present invention provides a sensor which can discriminate between warm bodies and inanimate objects behind a vehicle and can detect stationary warm bodies as well as moving ones. By pivotally scanning two vertically aligned passive infrared sensors, relative motion is established between the sensors and the stationary warm body in order to provide a positive indication of the presence of the stationary body over an extended field of view.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the present invention.

What is claimed is:

1. A backup proximity sensor for a vehicle, the sensor comprising:

a first passive infrared sensor (PIR), the first PIR having a first field of view and generating a first output signal in response to a warm body being detected within the first field of view;

a second passive infrared sensor (PIR), the second PIR having a second field of view and generating a second output signal in response to a warm body being detected within the second field of view;

a support member, the first PIR and the second PIR being affixed to the support member substantially vertically with respect to one another, the first PIR and the second PIR being angularly directed such that the first field of view and the second field of view intersect, the intersection defining a detection zone, the support member being pivotally mounted to provide for scanning of the detection zone in a region behind the vehicle;

a pivotal drive mechanism driving the support member; and a detection circuit, the detection circuit being responsive to the first output signal and the second output signal, the detection circuit providing a third output signal indicative of a warm body being present within the detection zone.

2. A backup proximity sensor for a vehicle as defined by claim 1, wherein:

the first PIR is mounted below the second PIR;

the first PIR is directed such that the first field of view is substantially parallel with a surface on which the vehicle is moving; and the second PIR is directed at an angle toward the surface on which the vehicle is moving such that the first field of view and the second field of view intersect.

3. A backup proximity sensor for a vehicle as defined by claim 2, wherein the first PIR is mounted about eight inches above the surface on which the vehicle is moving.

4. A backup proximity sensor for a vehicle as defined by claim 3, wherein the second PIR is mounted about 12 inches above the first PIR and is directed downward at an angle of about 16 degrees.

5. A backup proximity sensor for a vehicle as defined by claim 1, wherein the region behind the vehicle is an arc of about 180 degrees.

6. A backup proximity sensor for a vehicle as defined by claim 1, further comprising a driver warning system, the driver warning system being responsive to the third output signal and providing an indication that a warm body has been detected behind the vehicle.

7. A backup proximity sensor for a vehicle as defined by claim 6, wherein the indication is a visual signal.

8. A backup proximity sensor for a vehicle as defined by claim 6, wherein the indication is an audible signal.

9. A backup proximity sensor for a vehicle as defined by claim 6, wherein the indication is a tactile signal.

10. A backup proximity sensor for a vehicle as defined by claim 1, further comprising a vehicle interface processor, the vehicle interface processor being responsive to the third output signal and providing a control signal to alter the operation of the vehicle.

11. A backup proximity sensor for a vehicle as defined by claim 10, wherein the vehicle includes a lawn cutting attachment responsive to the control signal and the control signal disables the lawn cutting attachment when a warm body is detected behind the vehicle.

12. A backup proximity sensor for a vehicle as defined by claim 10, wherein the vehicle includes an engine responsive to the control signal and the control signal disables the engine when a warm body is detected behind the vehicle.

13. A backup proximity sensor for a vehicle as defined by claim 10, wherein the vehicle includes a braking system responsive to the control signal and the control signal engages the braking system when a warm body is detected behind the vehicle.

14. A lawn tractor, including a lawn cutting attachment, in combination with a backup proximity sensor, the backup proximity sensor comprising:

a first passive infrared sensor (PIR), the first PIR having a first field of view and generating a first output signal in response to a warm body being detected within the first field of view;

a second passive infrared sensor (PIR), the second PIR having a second field of view and generating a second output signal in response to a warm body being detected within the second field of view;

a support member, the first PIR and the second PIR being affixed to the support member substantially vertically with respect to one another, the first PIR and the second PIR being angularly directed such that the first field of view and the second field of view intersect, the intersection defining a detection zone, the support member being pivotally mounted to provide scanning of the detection zone in a region behind the vehicle;

a pivotal drive mechanism driving the support member;

a detection circuit, the detection circuit being responsive to the first output signal and the second output signal, the detection circuit providing a third output signal indicative of a warm body being present within the detection zone; and a driver warning system, the driver warning system being responsive to the third output signal, the driver warning system providing an indication that a warm body has been detected behind the vehicle.

15. A lawn tractor in combination with a backup proximity sensor as defined by claim 14, wherein the indication is a least one of a visual signal, an audible signal and a tactile signal.

16. A lawn tractor in combination with a backup proximity sensor as defined by claim 14, further comprising a vehicle interface processor, the vehicle interface processor being responsive to the third output signal and providing a control signal to alter the operation of the tractor.

17. A lawn tractor in combination with a backup proximity sensor as defined by claim 16, wherein the lawn cutting attachment is responsive to the control signal and the control signal disables the lawn cutting attachment when a warm body is detected behind the vehicle.

18. A lawn tractor in combination with a backup proximity sensor as defined by claim 16, wherein the tractor includes an engine responsive to the control signal and the control signal disables the engine when a warm body is detected behind the vehicle.

19. A lawn tractor in combination with a backup proximity sensor as defined by claim 16, wherein the vehicle tractor includes a braking system responsive to the control signal and the control signal engages the braking system when a warm body is detected behind the vehicle.

* * * * *